July 11, 1961
P. S. BALDWIN
2,991,797
DEVICE FOR DIFFERENTIAL BRAKING OF FORE AND
REAR WHEELS OF A MOTOR VEHICLE
Filed Nov. 10, 1958
2 Sheets-Sheet 1
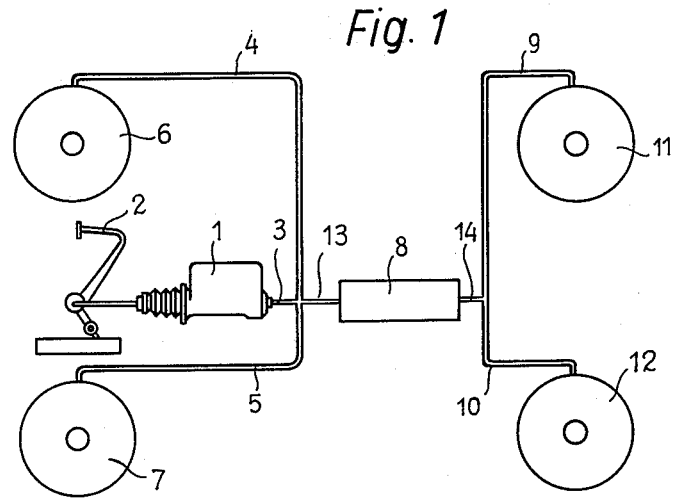
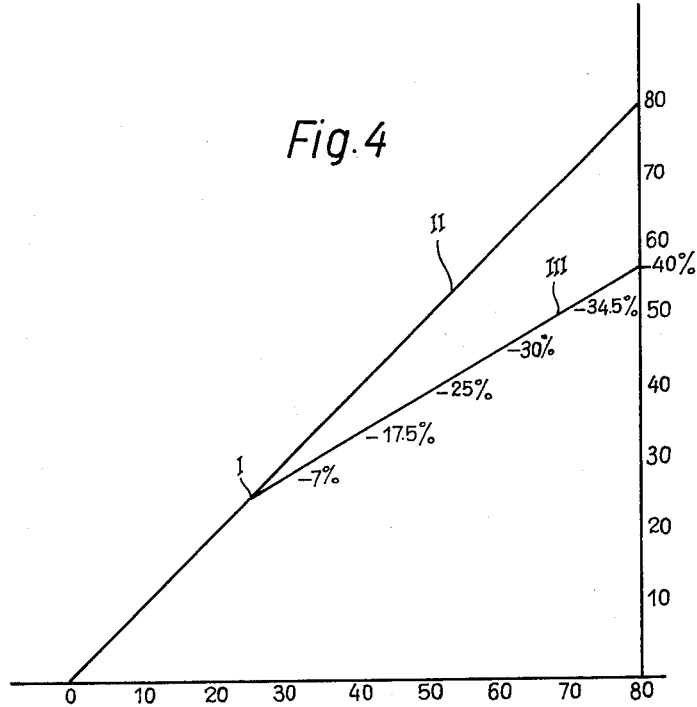

July 11, 1961
P. S. BALDWIN
2,991,797
DEVICE FOR DIFFERENTIAL BRAKING OF FORE AND
REAR WHEELS OF A MOTOR VEHICLE
Filed Nov. 10, 1958
2 Sheets-Sheet 2
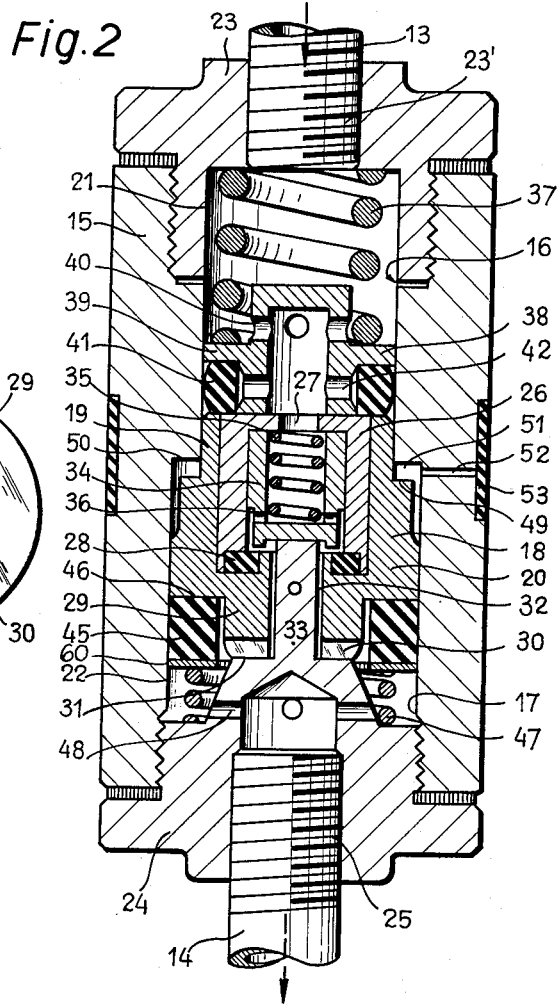

United States Patent Office 2,991,797
Patented July 11, 1961

2,991,797
DEVICE FOR DIFFERENTIAL BRAKING OF FORE AND REAR WHEELS OF A MOTOR VEHICLE
Philip Sidney Baldwin, Florence, Italy, assignor to Fiat Società per Azioni, Turin, Italy
Filed Nov. 10, 1958, Ser. No. 773,097
Claims priority, application France Nov. 14, 1957
7 Claims. (Cl. 137—493)

This invention relates to a device for use in connection with hydraulic braking mechanisms on motor vehicles, which is adapted to reduce the braking power on rear wheels with respect to the braking power on fore wheels beyond a certain braking pressure.

It is known that during braking and inherent deceleration of a motor vehicle the load on the fore wheels increases, the load on the rear wheels decreasing at the same time. This process depends upon various factors and it may be stated that other conditions such as the total mass of the braked vehicle, position of the centre of gravity, etc. being the same, it is all the more effective as the deceleration to which the vehicle is subjected on braking is higher.

As the centre of gravity of the vehicle is displaced forwardly in the direction of the fore axle, which occurs when, under normal conditions, the centre of gravity is situated above the horizontal plane containing the centre line of the fore wheels, adherence of the rear wheels to the road is objectionably reduced and, should braking power applied thereon not be gradually decreased, the rear wheels are blocked and skid on the road.

The purpose of this invention is to obviate the above-mentioned drawback by providing a device which is simple and inexpensive to manufacture and reliable in working, adapted for use on hydraulic braking mechanisms for motor vehicles of a conventional structure.

According to this invention the device is interposed in the conduit connecting the master cylinder with the branch pipes transmitting the braking pressure to the brake cylinders on the rear wheels of the vehicle. The device mainly comprises a cylinder and a piston movable therein, the said piston subdividing the cylinder bore into two chambers, one chamber being connected to the outlet of the master cylinder, the other chamber being connected to the brake cylinders on the rear wheels. The chamber connected with the master cylinder outlet houses a powerful spring of low flexibility which constantly urges said piston in a direction towards the secondmentioned chamber connected with the brake cylinders on the rear wheels. A through-conduit is bored in the piston and connects together the firstmentioned and secondmentioned chambers, the braking liquid flow through said conduit from the firstmentioned towards the second-mentioned chamber being controlled by a valve opening in the direction of the firstmentioned chamber and normally subjected to the action of spring means biasing the valve towards its closing position. When the piston is in its position corresponding to the inoperative condition of the device, the valve is open against the action of the abovementioned spring means, for the valve is slightly removed from its seat and bears against the end of a rod supported by the cylinder, the said rod extending through the conduit bored in the piston and reaching into the said conduit from the side of the secondmentioned chamber.

The secondmentioned chamber houses means cooperating with the said piston and adapted under the action of hydraulic pressure transmitted on braking to said secondmentioned chamber to push the piston in a direction opposite to the thrust exerted on the piston by the spring, and, on braking, by the hydraulic pressure transmitted from the master cylinder to the firstmentioned chamber. Said means are of such construction that the thrust exerted thereby on the piston becomes beyond a given pressure greater than the thrust on the piston in an opposite direction, whereby the piston is displaced towards the firstmentioned chamber, the valve is caused to close and, on further rise of the braking pressure in the first-mentioned chamber, a gradually rising pressure results in said secondmentioned chamber, however at a smaller rate than the rise in braking pressure transmitted from the master cylinder to said firstmentioned chamber.

In other words with the use of the improved device up to a certain hydraulic control pressure, i.e. up to a pressure resulting from a relatively moderate braking, the brakes behave normally as on a motor vehicle equipped with a hydraulic braking system of a conventional type. However, as the control pressure rises during a more powerful braking, such as when the car runs at high speed, the hydraulic pressure transmitted to the cylinders on the rear wheels gradually rises at a rate which is smaller with respect to the pressure rise in the cylinders on the fore wheels.

Assuming the device becomes effective as the control pressure reaches 25 kgs./cm.², the hydraulic pressure in the cylinders on the fore and rear wheels will be equal before the said pressure is reached, and on an increase in control pressure beyond 25 kgs./cm², though the pressure in the rear wheel cylinders increases, it is gradually reduced with respect to the pressure transmitted to the fore wheel cylinders. As deceleration is greater, the car weight being displaced forwardly, braking of the rear wheels is accordingly reduced in relationship with the braking of the front wheels.

The above and further characteristic features and advantages of this invention shall now be described with reference to the accompanying drawing, which shows by way of a non-limiting example an embodiment thereof. On the drawing:

FIGURE 1 shows diagrammatically a hydraulic braking system for a motor vehicle modified according to this invention, FIGURE 2 is a longitudinal sectional view of the improved device, FIGURE 3 is a front view of a constructional detail of the device shown in FIGURE 2, FIGURE 4 is an explanatory diagram showing the variation in pressure transmitted to the fore and rear wheel cylinders, respectively, of a vehicle dependently upon the control pressure transmitted by the master cylinder.

On the drawing, FIGURE 1 diagrammatically shows a hydraulic braking system for a motor vehicle comprising a master cylinder 1, which is controlled by the brake pedal 2 and is connected by a piping 3 at one hand with the conduits 4 and 5 connecting with the brake cylinders (not shown) for the brake drums 6 and 7 on the fore wheels of a vehicle and at the other hand through a device 8, the structure of which shall be described hereafter, with branch pipes 9 and 10 connecting with the cylinders provided for the brake drums 11, 12, respectively, on the rear wheels of the vehicle.

The device 8 is connected with the conduit 3 through a short connecting pipe 13 and with the conduits 9 and 10 through a connecting pipe 14.

The device generally indicated by 8 on FIGURE 1 mainly comprises a metal cylinder 15 (FIG. 2) having an internal through-bore including two sections differing in diameter, more particularly a small diameter section 16 and a large diameter section 17. The cylinder 15 has movable in its bore a differential piston 18, the small diameter section 19 of which is received by the section 16, the large diameter section 20 of the piston being received by the section 17 of the bore in the cylinder 15. The piston 18 subdivides the cylinder bore into two main chambers, of which the chamber 21 connects with the master cylinder outlet, the chamber 22 connecting with the cylinders of the rear wheel brakes. The chamber 21 is closed to the outside by a plug 23 screwed into a tapped seating in the cylinder 15 and having a central tapped aperture 23' for attachment of the pipe 13 connecting with the master cylinder outlet. The chamber 22 is closed to the outside by a plug 24 which is likewise screwed into a tapped seating in the cylinder 15 and is formed with a blind tapped hole 25 for attachment of the pipe 14 leading to the brake cylinders on the rear wheels. The piston 18 is formed with a cylindrical bore connecting with the chamber 21. The said bore receives a cylindrical cup 26, the bottom of which faces the chamber 21 and is formed with a hole 27. The edge of the cylindrical side wall of the cup 26 bears against an annular packing 28 placed on the bottom of the bore in the piston. On the side of the chamber 22 the piston 18 is formed with a projection 29 having radial ribs 30 on its front face. The ribs 30 bear on the front face 31 of the bottom of the plug 24.

The arrangement of the ribs 30 on the front face of the small diameter portion 29 of the piston 18 facing the plug 24 is more clearly visible in FIGURE 3. The piston 18 is moreover formed with a coaxial bore extension 32 connecting the chamber 22 with the first-named bore in the piston receiving the cup 26. A push-rod 33 extends through the bore 32 and is securely fixed to the bottom of the plug 24, the push-rod 33 reaching by a certain extent within the chamber housing the cup 26. The free end of the push-rod 33 has bearing thereon the bottom of a valve member 34 likewise of a cup-shape adapted to slide within the cup 26. A spring 35 is interposed between the bottom of the cup 26 and that of the valve 34 and permanently urges the valve 34 towards the push-rod 33. Radial holes 36 are bored in a section of the side wall of the valve 34 which is smaller in diameter than the bore in the cup 26. The holes 36 cause the hydraulic liquid to flow through the valve which under normal conditions is constantly open for the push-rod 33 reaching as mentioned above by a certain extent into the bore in the piston 18 receiving the cup 26. The piston 18 is constantly acted upon by a strong reaction spring 37 urging it towards the plug 24.

The reaction spring 37 is arranged within the chamber 21 and is interposed between the plug 23 and a radial flange 38 on a sleeve member 39 having a bottom facing the plug 23 and bearing at its opposite end on the cup 26. The bore in the sleeve member 39 connects with the chamber 21 through a plurality of radial holes 40. An annular packing 41 made of rubber is interposed between the face of the radial flange 38 on the sleeve member 39 remote from the face having bearing thereon one end of the reaction spring 37, and the adjacent end of the piston 18.

The outer periphery of arcuate cross-sectional shape on the packing 41 contacts the inner periphery of the chamber 21. The bore of the ring 41 slightly exceeds in size the outer diameter of the section of the sleeve member 39 reaching within the ring 41. The axial length of the ring 41 exceeds the spacing of the free end edge of the side wall of the sleeve member 39 and the face of its radial flange 38 in contact with the ring 41. Radial holes 42 connect the annular clearance between the inner periphery of the ring 41 and the outer periphery of the sleeve member 39 with the bore in the sleeve member 39 connecting with the chamber 21. Through this structure the ring 41 is axially compressed and radially urged outwardly by the hydraulic pressure transmitted to the chamber 21 from the master cylinder. This tightly seals the chamber 21 on the side of the small diameter section 19 of the piston 18.

The large diameter section of the piston is sealed by a resilient packing ring 45 made of rubber, which is similar to the ring 41 and bears at one end on the radial abutment 46 formed between the large diameter portion 20 of the piston and its smaller diameter end 29 formed with ribs 30, and at its other end on a washer 60. The washer 60 is urged against the sealing ring 45 by a spring 47 bearing on the plug 24. Radial openings 48 bored in the plug 24 connect the chamber 22 with the bore 25 in the plug 24.

The small and large diameter sections 19, 20, respectively, of the piston merge into each other forming an annular step resulting in a radial abutment 49 in front of the radial abutment 50 separating the sections differing in diameter of the bore in the cylinder 15.

As will be seen from the drawing, in the normal condition of the component parts of the system the abutments 49 and 50 are spaced so that a third annular chamber 51 is formed within the cylinder. The chamber 51 connects with the outside through a radial hole 52 bored in the wall of the cylinder 15. An elastic band 53 made of rubber, received by a circumferential shallow groove cut adjacent the hole 52, protects the hole 52 against access of foreign bodies.

The device operates as follows:

On depressing the brake pedal 2, control pressure is transmitted from the master cylinder to the chamber 21, which may be referred to as high pressure chamber, whence it is transmitted through the pipe 13, through the holes 40, bore in the sleeve member 39, hole 27, bore in the valve 34 and clearance between the push-rod 33 and inner periphery of the through-bore in the piston to the chamber 22, which may be referred to as low pressure chamber for reasons as will appear from the following description.

Braking pressure for rear wheels is transmitted from the low pressure chamber 22 through the holes 48 in the plug 24, its tapped bore 25 and pipe 14 to the brake cylinders of the rear wheels.

As the control pressure rises beyond a certain limit, which may conveniently be of about 25 kgs./cm.$^2$, the piston 18 is moved against the reaction of the spring 37 towards the high pressure chamber 21 and is displaced with respect of the push-rod 33 which is fast with the plug 24, whereby the valve 34 intercepts communication between the throughbore 32 in the piston and its bore section receiving the valve 34. Closure of the valve 34 is facilitated by the thrust exerted thereon by the spring 35. Connection between the high and low pressure chambers 21, 22, respectively, is thereby intercepted.

The control pressure transmitted from the master cylinder 1 now acts on the small diameter section of the piston 18, whereby the hydraulic pressure in the low pressure chamber 22 on a further increase in control pressure transmitted from the master cylinder 1 is of a reduced value with respect to the latter. Consequently, the pressure in the brake cylinders on the rear vehicle wheels is accordingly minor. The piston is under these conditions somewhat displaced towards the plug 23 with respect to its position shown in FIGURE 2, the ribs 30 on its small diameter front section 29 facing the plug 24 being however spaced from the radial abutment 31 on the bottom of the plug 24.

On rise of the control pressure in the chamber 21 and possible yield of the pipings and brake components in the secondary circuit leading to the rear wheels, a further hydraulic fluid supply from the chamber 21 to the chamber 22 is required. This takes place through the valve 34 for, on rise of pressure in the chamber 21, the piston 18 is moved towards the plug 24. Relative movement of the piston 18 to the push-rod 33 results in opening of the valve 34 by a very slight extent affording a limited liquid supply to the chamber 22.

On decrease in control pressure in the chamber 21 the liquid pressure in the chamber 22 overcomes the tension of the spring 35 and reopens the valve 34. The liquid in the circuit connected with the brake cylinders on the rear wheels can be thereby discharged into the master cylinder circuit. The piston 18 is now urged by the spring 37 towards the plug 24, the valve being brought into contact with the push-rod 33 which maintains it in its open position.

It will be seen from the above that, in order to shut off the chambers 21 and 22 from each other, a very slight displacement of the piston 18 against the reaction of the spring 37 is sufficient to release the valve 34 from the end of the push-rod 33, which occurs at a predetermined control pressure corresponding to the braking pressure, acting on the large diameter face of the differential piston 18 to overcome the force of the spring 37.

It will be understood that the reduction ratio of the increase in pressure occurring in the circuit leading to the brake cylinders on the fore wheels and the increase incurring in the circuit leading to the rear wheels depends, the force exerted on the piston 18 by the spring 37 being equal, upon the difference in cross-sectional area of the piston. Assuming the large diameter section of the piston is 5.6 cm.² (diameter=25 mm.) and the small diameter section is 3.14 cm.² in area (diameter=20 mm.), the reduction ratio is about 60%. A differential piston of the above mentioned size requires a reaction spring 37 exerting an effective thrust on the piston of about 48 kgs. in order to cause the device to become operative when the control pressure transmitted from the master cylinder is 25 kgs./cm.².

On the diagram shown in FIGURE 4, the abscissae denote the control pressure transmitted from the master cylinder, the ordinates being the pressure values in the circuit leading to the rear and fore wheel cylinders, respectively.

It will be clearly seen from the diagram that up to a pressure of 25 kgs./cm.² the braking pressures in the rear wheel cylinders and fore wheel cylinders are identical. Beyond a control pressure of 25 kgs./cm.², the pressure in the fore wheel cylinders increases linearly, constantly keeping equal to the control pressure at the master cylinder outlet allowing for any pressure loss in the piping, whereas the pressure in the rear wheel cylinders increases more slowly. On the diagram, point I denotes the point at which the device becomes operative, II is the straight line corresponding to the behaviour of the pressure in the fore wheel brake cylinders, and III is the straight line denoting the variation in pressure in the rear wheel brake cylinders on control pressures exceeding 25 kgs./cm.².

A few considerations should now be made in connection with the characteristics of the reaction spring 37.

The reaction spring 37 should exert a considerable effective load on the differential piston 18 in order to properly delay the tripping of the device and should additionally possess a low flexibility factor. Namely, this spring should be rather stiff.

Actually, the effective spring force should be such as to resist about 25 kgs./cm.² pressure before the piston 18 moves and closes the valve 34.

With a ratio of the diameters of the chambers 22, 21 equalling 25.4 mm./20 mm., the initial spring load should amount to 48 kgs. As regards flexibility, in order to compress the spring 37 by one millimeter, the control pressure should increase by about 2 kgs./cm.², in no case less than 1 kg./cm.². Consequently, the flexibility of the spring 37 should amount to 3.86 kgs./mm. and never be less than 1.93 kgs./mm.

A generic numerical relation between the load and flexibility of the reaction spring may be derived from the following formulae:

(1) $$Z = \left(\frac{d}{D}\right)^2$$

(2) $$F = p_i \frac{\pi}{4}(D^2 - d^2) = p_i \frac{\pi}{4} D^2 (1 - Z)$$

(3) $$\Delta F = \Delta p \frac{\pi}{4}(D^2 - d^2) = \Delta p \frac{\pi}{4} D^2 (1 - Z)$$

(4) $$K = \frac{\Delta F}{\Delta l} = \frac{\Delta p}{\Delta l} \frac{\pi}{4} D^2 (1 - Z)$$

(5) $$p_2 = p_i + (p_1 - p_i) Z$$

wherein, $d$=diameter of the high pressure chamber 21 (cm.)
$D$=diameter of the low pressure chamber 22 (cm.)
$p_i$=pressure at which the device becomes effective (kgs./sq.cm.)
$F$=pre-load of reaction spring 37 (kgs.)
$\Delta p$=rise in control pressure required for closing the valve 34 (kgs./sq.cm.)
$\Delta F$=corresponding increase in the load of spring 37 (kgs.)
$K$=flexibility of spring 37 (kgs./cm.)
$\Delta l$=displacement of valve 34 from inoperative to closed position (cm.)
$p_2$=operating pressure after the device has become effective (kgs./sq.cm.)
$p_1$=control pressure transmitted by master cylinder (kgs./sq.cm.)
$Z$=pressure reduction rate.

Assuming the optimum spring flexibility to be the flexibility affording displacements of the differential piston of 0.1 cm. as the control pressure rises by 1 to 2 kgs./sq.cm., upon coming into action of the device, $p_i$ ranging between 20 and 40 kgs./sq.cm., K should range between $2.5\pi D^2 (1-Z)$ and $5\pi D^2 (1-Z)$ kgs./cm.

Should the spring 37 be excessively flexible (insufficiently stiff), on the closing step of the valve 34 the control pressure (in the chamber 21) and working pressure (in the chamber 22) would remain static, this resulting in a corresponding "neutral" lowering of the brake pedal 2. This is not admissible, for the brake should always be "felt" under the driver's foot.

For instance, assuming a stroke of the piston 18 of 1.3 mm. (the ratio of the diameters of the chambers 22, 21 being 25.4/20 mm.), and a diameter of the piston in the master cylinder 1 for instance of 18.05 mm., the stroke of the master piston required for closing the valve 34 would amount to 1 mm. With a transmission ratio 6:1 of the pedal lever 2 the "neutral" pedal stroke, during which the brake would not be "felt," would amount to 6 mm.

The effective initial load exerted by the spring 37 on the piston 18 is essential for, in the absence thereof, the device would be fully superfluous, the differential braking of the fore and rear wheels, respectively, being obtainable by making the brake cylinders of suitable diameters on the wheel pairs.

What I claim is:

1. In a hydraulic system having means for supplying fluid under pressure and a hydraulic motor operatively supplied with said fluid a pressure regulating device intermediate said pressure fluid supply means and said hydraulic motor, said device comprising a cylinder defining a high pressure input chamber and a low pressure output chamber, a slidable piston means intermediate said chambers, the area of the piston exposed to pressure in the low pressure chamber being greater than that exposed to the pressure in said high pressure chamber, a spring in said high pressure chamber for biasing said piston means towards said low pressure chamber, a fluid flow conduit in said piston connecting said chambers, a valve slidable in said channel to control the flow through said chambers, spring means adjacent said high pressure chamber and acting on said valve to urge it to its closed position, means for holding said valve open against the action of said spring means, whereby upon a rise of pressure in said high pressure chamber sufficient to overcome the force of said spring in said high pressure chamber, the valve is caused to close after the displacement of the piston towards said high pressure chamber, the continued rise of pressure in said high pressure chamber, after the closing of the valve, building up pressure on the piston to increase the pressure in said low pressure chamber to an extent lower than in said high pressure chamber, said valve remaining closed at this stage to prevent flow of fluid between said chambers, said valve reopening upon a drop in pressure in said high pressure chamber to admit return flow from said low pressure chamber.

2. A device according to claim 1, wherein said spring is a helical spring of low flexibility factor.

3. A device according to claim 1, wherein the outer periphery of the small diameter section of the piston and the inner periphery of the first mentioned chamber in the cylinder are sealed by a ring of resilient material, the outer periphery of which adjacent the inner wall of the first mentioned chamber is of an arcuate cross-sectional shape, the ring being arranged adjacent the front face of the small diameter section of the piston and being axially compressed by the spring arranged in the first mentioned chamber through the interposition of a rigid metal member.

4. A device according to claim 1, wherein the outer periphery of the large diameter section of the piston and the inner periphery of the said second mentioned chamber are sealed by a ring of resilient material having its outer periphery abutting the inner wall of the said second mentioned chamber of an arcuate cross-sectional shape, the ring being arranged adjacent the front face of the large diameter section of the piston facing the said second mentioned chamber and compressed by a spring received by the said second mentioned chamber and bearing against the plug through the interposition of a washer.

5. A pressure regulating device for hydraulic brake systems of the type comprising a source of fluid under pressure and a hydraulic motor, said device comprising a cylinder and a high pressure and a low pressure chamber therein, a piston movable in said chambers and responsive to fluid under pressure, the area of the piston exposed to pressure in the low pressure chamber being greater than that exposed to pressure in said high pressure chamber, a conduit in said pistons connecting said chambers, a valve in said conduit to admit fluid under pressure from said high pressure to said low pressure chamber, a first spring means for resisting the stroke of the piston towards said high pressure chamber, a second spring means for urging said valve to its closed position, a stationary member for holding said valve normally open when the piston is displaced towards said low pressure chamber, said first spring means preventing any movement of the piston towards said high pressure chamber before a predetermined rise in pressure in said low pressure chamber sufficient to overcome the force of said first spring means, said valve shutting off the communication between said chambers after the piston has moved against the action of said first spring means, said valve being thereupon maintained closed by said second spring means, whereby the pressure in said low pressure chamber rises only as further rises in pressure in said high pressure chamber balances the pressure in said low pressure chamber sufficient for said first spring means to displace said piston toward said low pressure chamber and therefore more slowly than the pressure rise in said high pressure chamber, and the pressure in said low pressure chamber falls, upon a fall in pressure in said high pressure chamber, sufficiently for the differential in pressures in said chamber to open said valve against said second spring means to release the pressure in said low pressure chamber sufficient for said first spring means to displace said piston toward said low pressure chamber.

6. In a hydraulic system having means for supplying fluid under pressure and a hydraulic motor, a pressure regulating device connected intermediate said means and said motor, said device comprising a cylinder providing a high pressure chamber and a low pressure chamber, piston means movable in each of said chambers, means interconnecting said piston means to move together, the area of the piston means exposed to fluid pressure in said high pressure chamber being materially smaller than the substantially constant area of the piston means exposed to fluid pressure in said low pressure chamber, so that pressure in said high pressure chamber tends to move said piston to apply a lower pressure to fluid in said low pressure chamber, a stiff compression spring in said high pressure chamber and acting on said piston means to oppose its movement towards said high pressure chamber, a fluid flow channel in said piston means connecting said chambers for flow of fluid from said high pressure to said low pressure chamber, means for sealing said chambers except for said channel, valve means controlling flow of fluid through said channel and comprising a valve seat surrounding said channel and a valve member in said channel movable relative to said piston and movable relative to said seat between open and closed positions, and closing in the direction of said low pressure chamber, said movement of the valve member being dependent of the movement of said piston means, spring means biasing said valve towards closed position and means controlling said valve member and connected with said cylinder for holding the valve open till the rise in pressure in said low pressure chamber sufficient to overcome the force of said stiff compression spring, said means controlling said valve member comprising a rod fast with the cylinder and extending through said channel in said piston means in the direction of said high pressure chamber.

7. A fluid pressure regulating device adapted to be inserted in a hydraulic circuit between a source of pressure which is in a primary circuit, and the point at which the pressure is applied as working pressure in a secondary circuit, said device comprising a stepped cylinder with a through bore having two diameters and bases, a compound piston with a head and reduced projection for the cylinder, the head and projection having a sliding fit respectively in the larger and smaller of the two diameters of the cylinder bore, the space between said projection and one base forming a high pressure chamber, the space between the piston head and the other base forming a low pressure chamber, sealing means for the piston head and the projection thereof, valve means carried by the piston permitting free passage of fluid from said high pressure to said low pressure chamber but closing said passage in reverse direction when a given pressure has been reached in said low pressure chamber, and reopening said passage on release of pressure, spring means inserted in said high pressure chamber under axial pressure and bearing on the end of said projection of the piston, said spring means being designed to resist the movement of the compound piston in the direction of said high pressure chamber until a given pressure has been reached therein.

References Cited in the file of this patent

UNITED STATES PATENTS

| 2,242,297 | Freeman | May 20, 1941 |
| 2,835,271 | Oberthur | May 20, 1958 |
| 2,844,161 | Ostwald | July 22, 1958 |
| 2,861,589 | Ostwald | Nov. 25, 1958 |

FOREIGN PATENTS

| 283,174 | Switzerland | Sept. 16, 1952 |

UNITED STATES PATENT OFFICE
CERTIFICATE OF CORRECTION

Patent No. 2,991,797                              July 11, 196

Philip Sidney Baldwin

It is hereby certified that error appears in the above numbered patent requiring correction and that the said Letters Patent should read as corrected below.

In the heading to the printed specification, line 7 should appear as shown below instead of as in the patent:

Claims priority, application Italy Nov. 14, 1957

Signed and sealed this 6th day of March 1962.

(SEAL)
Attest:

ERNEST W. SWIDER                            DAVID L. LADD
Attesting Officer                              Commissioner of Patents

UNITED STATES PATENT OFFICE
CERTIFICATE OF CORRECTION

Patent No. 2,991,797            July 11, 1961

Philip Sidney Baldwin

It is hereby certified that error appears in the above numbered patent requiring correction and that the said Letters Patent should read as corrected below.

In the grant, line 2, for "assignor to Fiat Società per Azioni, of Turin, Italy," read -- assignor of one-half to Fiat Società per Azioni, of Turin, Italy, --; line 11, for "Fiat Società per Azioni, its successors" read -- Philip Sidney Baldwin, his heirs or assigns, and Fiat Società per Azioni, its successors --; in the heading to the printed specification, lines 4 and 5, for "assignor to Fiat Società per Azioni, Turin, Italy" read -- assignor of one-half to Fiat Società per Azioni, Turin, Italy --.

Signed and sealed this 4th day of September 1962.

(SEAL)
Attest:

ERNEST W. SWIDER            DAVID L. LADD

Attesting Officer            Commissioner of Patents